United States Patent Office 2,842,602
Patented July 8, 1958

2,842,602

STABILIZATION OF MONOMERS

William T. Norton, New Castle, Del., assignor to E. I. du Pont de Nemours and Company, Wilmington, Del., a corporation of Delaware No Drawing. Application January 4, 1956
Serial No. 557,247

4 Claims. (Cl. 260—652.5)

This invention relates to the storage and processing of polymerizable ethylenically unsaturated compounds, and more particularly to preventing the formation from such compounds of the granular, insoluble, self-propagating type of polymer known as omega polymer [Carothers et al., J. A. C. S. 53, 4205 (1931)], which is generally referred to as popcorn polymer, or cauliflower polymer.

The formation of granular polymers has furnished serious difficulties ever since polymerizable compounds such as chloroprene, butadiene and styrene were first handled on a commercial scale, by forming extremely troublesome deposits in storage tanks, pipelines, stills, etc., in which the monomer is present in either liquid or vapor phase. These granular polymers are self-propagating, that is, they initiate the formation of more granular polymer. Thus, masses of the polymer, once formed, continue to grow at an ever-increasing rate, and minute particles of the polymer (seeds) may be carried from one part to another of the equipment and start polymerization wherever they are carried. The formation of these polymers first interferes with flow through pipes and with the operation of such devices as rupture discs, but will finally fill the whole of the equipment in which the monomer is held, and their growth does not stop until all of the monomer is used. Since the formation of the granular polymer takes place with an over-all increase in volume, equipment has even been ruptured by the polymer formed therein.

Complete removal of the granular polymer from equipment in which even a small amount of it is formed, is laborious and almost impossible. The polymer is insoluble in all organic solvents, and its toughness makes it hard to remove mechanically. Moreover, since the polymer is self-propagating, the equipment rapidly becomes fouled again unless all traces of the active polymer are removed. Even then the polymer will form again, either spontaneously or from the transportation of seeds from other parts of the system, as explained above.

Several chemical methods have been proposed for preventing the formation and growth of popcorn polymers from the various monomers and some of these have proved effective and practical in specific cases. In general they involve treating the polymerizable liquid with aqueous solutions such as sodium nitrite, or dissolving small amounts of gaseous agents directly in the polymerizable liquids, or treating the vapor of the polymerizable compounds with such agents. It will be seen that these procedures considerably complicate the handling of the polymerizable compounds and in most cases require the removal of the agent before the material which it has stabilized can be used. Methods are also available for deactivating the popcorn polymer so that it will no longer initiate the formation of more polymer, but these methods have only a limited application because they cannot be applied in the equipment as it is being operated.

It is an object of this invention to stabilize polymerizable ethylenically unsaturated compounds while they are in storage or being processed, to prevent the formation of granular, self-propagating polymers. It is a further object of the invention to provide a process for stabilizing polymerizable ethylenically unsaturated compounds in a simple and economical manner in which the stabilizing agent is not taken into solution and is readily separated from the polymerizable compound.

I have found that granular polymer formation in polymerizable ethylenically unsaturated monomers can be inhibited by simply contacting the monomers with the nitrite form of a strongly basic N-containing anion exchange resin. These strongly basic anion exchange resins are well known articles of commerce. They are organic polymers containing quaternary ammonium groups and are insoluble in water and the usual organic solvents. One type is made by chloromethylating a polystyrene resin and then quaternizing the chloromethyl groups with a tertiary-amine or other quaternizing agent. The resulting quaternary salts ionize in water, the positive portion remaining attached to the resin and the negative portion, such as the chloride ion, passing into solution but remaining bound to the positively charged resin by the electrostatic forces. This ion may, however, be replaced by another ion, for example, hydroxyl. These resins are said to be in the chloride and hydroxide forms, respectively. The present invention uses the nitrite form ($NO_2$), which is conveniently made by treating the hydroxide form with an excess of sodium nitrite solution, washing and drying.

Any strongly basic anion exchange resin may be used. A satisfactory type which is commercially available under several names is made by chloromethylating a copolymer of styrene containing enough divinyl benzene to make the resin infusible, and then quaternizing with trimethyl-amine.

The anion exchange resins are available commercially as grains of uniform size. The nitrite form of course retains this same form, which is suitable for the present invention. The resin is readily separated from the monomer treated by filtration or merely by allowing it to remain at the bottom of a vessel and drawing off the monomer.

The proportion of nitrite ion ($NO_2$) in the anion exchange resin as employed in this process will preferably be from 0.001% to 0.25% or more of the monomer to be stabilized. The amount of resin used to prevent popcorn formation in the monomer will thus depend upon the percentage of nitrite in the resin, the particular monomer to be stabilized, and the degree of stabilization desired (that is, the conditions under which it is to be maintained stable against popcorn polymer formation). In chloroprene, 0.01% of a resin containing 12.8% nitrite ($NO_2$) has a valuable stabilizing effect. This corresponds to about 13 parts of nitrite per million parts of chloroprene. Larger proportions of resin up to 2.5% and higher give increasing effects.

These quaternary salts of tertiary amines may of course be prepared in any suitable manner. The following is a specific illustration of the preparation of the stabilizers employed in the present invention.

A glass column, or glass-lined column, having a diameter of 38 mm. was fitted with a sintered glass disk support near the bottom, and a stop cock. Two hundred (200) milliequivalents of a strongly basic anion exchange resin known in commerce as "Amberlite" IRA–400, made by chloromethylating a copolymer of styrene with 8% of divinyl benzene (based on the weight of the styrene compound) which was then quaternized with trimethyl-amine, was introduced into the column in the form of 20 to 50 mesh beads as an 180 ml. aqueous slurry. The resin was washed by slowly passing 1 liter of 4% sodium hydroxide solution through the resin mass to convert it completely to the hydroxide form. The resin was then washed free of sodium hydroxide with distilled water. It was then converted to the nitrite form by allowing a solution of 40 grams (0.58 mol) of sodium nitrite in 500 cc. of water to flow slowly through the resin column. The resin, which was then in nitrite form, was washed free of base and excess reducing material by passing distilled water through the column. It was then washed with 500 ml. of 95% ethanol, removed from the column and air dried to give free-flowing granules. The air dried nitrite resin contained 12.8% of nitrite ion.

Active chloroprene popcorn polymer seeds used in the following examples were prepared as follows:

A small piece (0.05 gram) of active chloroprene popcorn polymer (obtained from a neoprene manufacturing plant) which had been stored under water, was washed wth methanol and ether to remove the water, and dried. This seed was placed in the thimble of a Soxhlet extractor and extracted with chloroprene which had been freshly distilled under nitrogen, was refluxed under nitrogen for 2 days, and the condensate was flowed over the seeds. The popcorn seed had grown at the ends of this time 10 to 20 fold to form hard, white, tough chloroprene popcorn polymer which retained in every part the property of self-propagation. After a few hours' air exposure this polymer turned yellow and lost its self-propagating ability; however, when stored under nitrogen it remained white and active.

Samples of this white, active popcorn polymer, weighing 0.039 g. and 0.024 g., respectively, were put into two bottles each containing 20 ml. of freshly distilled chloroprene. These bottles were capped under nitrogen and allowed to stand 66 hours at room temperature in diffuse light. The popcorn seeds increased in weight 5020% and 5100%, respectively.

The following examples are given to more fully illustrate the present invention.

*Example 1*

Into each of two chromic acid cleaned, narrow mouth screw cap bottles was measured 20 ml. of chloroprene which had been freshly distilled under nitrogen. In the first bottle was placed 0.0265 g. of fresh, active chloroprene popcorn seed and 0.500 g. of the nitrite form of the anion exchange resin, both prepared as described above. Thus, the nitrite ion in the resin was 0.333% of chloroprene by weight. In the second bottle was placed 0.021 g. of active popcorn seed; this bottle was used as the control. These two bottles were tightly capped under nitrogen and left to stand at room temperature in diffuse light.

After six days the popcorn seed in the control bottle had grown to convert the total 20 ml. of chloroprene monomer to popcorn polymer. Thirty-four (34) day after the initiation of the test, the chloroprene monomer in the first bottle containing the resinous inhibitor remained clear and mobile—the popcorn seed showed no sign of growth. After thirty-eight (38) days the chloroprene monomer in the first bottle began to form the ordinary linear polymer and become viscous. After sixty-eight (68) days, when the test was discontinued, there was still no sign of popcorn growth or initiation in this first bottle containing the nitrite resinous inhibitor.

Chloroprene which had stood in contact with the nitrite resin appeared to be entirely unaltered in any way except that popcorn polymer could not grown in it. It behaved normally in emulsion polymerization and gave a normal curable rubber-like polychloroprene.

Under the same conditions but varying the ratio of nitrite resin to chloroprene, the following results were obtained, with which the results from Example 1 are included for comparison.

| Example | Percent of Nitrite Resin [1] | Granular Polymer Formed |
| --- | --- | --- |
| 1 | 2.5 | None in 68 days. |
| 2 | 1.0 | None in 58 days. |
| 3 | 0.5 | Do. |
| 4 | 0.1 | Some in 36 days. |
| 5 | 0.05 | Some in 17 days. |
| 6 | 0.01 | Do. |
| Control | 0.00 | Complete in 6 days. |

[1] Based on the weight of chloroprene. The resin used contained 12.8% nitrite.

In each case where some popcorn polymer was formed (Examples 4, 5 and 6), it initiated in the vapor phase in the necks of the bottles above the liquid monomer. The seed in the liquid phase did not increase in size. Thus, as little as 0.01% of the resin effectively prevented the growth of popcorn polymer from active seeds in the liquid phase. As litle as 0.5% of the stabilizer prevented initiation of the polymer for the entire length of the test in the vapor above the liquid which was entirely out of contact with resin, and as little as 0.01% prevented formation of the polymer in the vapors for 17 days. In plant operation it has been found that the formation of the popcorn polymer in chloroprene manufacture is often initiated in the chloroprene monomer in the vapor stage, but in such cases the seeds often drop into the liquid and continue to grow. The initial formation of the popcorn polymer in the liquid also appears to be probable, although its initiation is apparently not fast in the liquid phase.

This series of tests repeated with the nitrite form of an anion exchange resin containing a beta-hydroxyethyl radical instead of one of the methyl radicals on the nitrogen, gave similar results except that somewhat more of the resin was required to produce the same effect.

*Example 7*

The "action at a distance" of the nitrite resin was illustrated as follows:

In each of the flasks of two Soxhlet extractors was placed 100 ml. of chloroprene and a trace of hydroquinone to inhibit linear polymerization in the flasks. In addition, in flask (I) was placed 0.500 g. of the nitrite resin used in the previous examples. In the extraction thimbles of flasks (I) and (II) were placed 0.0380 g. and 0.0275 g., respectively, of the active chloroprene popcorn polymer seeds. The chloroprene in these two extractors was refluxed for 24 hours in closed, nitrogen filled systems. The popcorn was then removed from both thimbles, washed thoroughly with chloroform and vacuum dried.

The popcorn polymer obtained from Soxhlet (I) which had the nitrite inhibitor in the flask, weighed 0.043 g.—a 13% increase.

The popcorn polymer obtained from Soxhlet (II), the control run, weighed 1.462 g.—a 5320% increase. At no time during this experiment did the popcorn seed in run (I) come in contact with the resin inhibitor, nor did it contact chloroprene which was simultaneously in contact with the resin inhibitor.

*Example 8*

Using the technique of Examples 1 to 6, the effect of the nitrite resin on the formation of granular popcorn polymer in styrene was shown, using the active seeds of chloroprene granular polymer as the initiator. In the control, containing 0.02 gram of seed in 50 ml. of styrene, about 25% of the styrene was converted to granular polymer in 41 days. On the other hand, as little as 0.01% of the nitrite resin completely prevented growth of popcorn polymer in both liquid and vapor phases over this entire period.

As illustrated above, a new and very effective method of preventing or inhibiting the formation and growth of granular popcorn polymer in polymerizable ethylenically unsaturated compounds has been provided by this invention. The nitrite form of the strongly basic N-containing anion exchange resin is effective in preventing or inhibiting the formation of the growth of granular popcorn polymers in monomers which are either in the liquid or the vapor phase. The process of the present invention is simple to operate since the material employed as a stabilizer is a solid from which the monomer can be readily separated. Since none of the stabilizer need remain in the monomer at the time it is used, there is no alteration of the properties of the monomer which has been stabilized.

I claim:

1. The process of inhibiting granular polymer formation in polymerizable ethylenically unsaturated monomers which form granular, self-propagating polymers, which comprises maintaining the monomers in contact with an amount of the nitrite form of an insoluble, strongly basic, N-containing anion exchange resin sufficient to provide at least 0.001% of the nitrite ion, based on the weight of the monomer.

2. The process of inhibiting granular polymer formation in chloroprene, which comprises maintaining the chloroprene in contact with an amount of the nitrite form of an insoluble, strongly basic, N-containing anion exchange resin sufficient to provide at least 0.001% of the nitrite ion, based on the weight of the chloroprene.

3. A polymerizable ethylenically unsaturated monomer which forms granular, self-propagating polymers containing an amount of the nitrite form of an insoluble, strongly basic, N-containing anion exchange resin sufficient to provide at least 0.001% of the nitrite ion, based on the weight of the monomer.

4. Chloroprene containing an amount of the nitrite form of an insoluble, strongly basic, N-containing anion exchange resin sufficient to provide at least 0.001% of the nitrite ion, based on the weight of the chloroprene.

No references cited.